(12) United States Patent
Wentz

(10) Patent No.: US 11,716,617 B2
(45) Date of Patent: Aug. 1, 2023

(54) SYSTEMS AND METHODS FOR CRYPTOGRAPHIC AUTHORIZATION OF WIRELESS COMMUNICATIONS

(71) Applicant: Ares Technologies, Inc.

(72) Inventor: Christian T Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 133 days.

(21) Appl. No.: 16/861,699

(22) Filed: Apr. 29, 2020

(65) Prior Publication Data

US 2020/0351657 A1    Nov. 5, 2020

Related U.S. Application Data

(60) Provisional application No. 62/841,934, filed on May 2, 2019.

(51) Int. Cl.
*H04W 12/06* (2021.01)
*H04L 9/32* (2006.01)
*H04W 12/63* (2021.01)

(52) U.S. Cl.
CPC .......... *H04W 12/06* (2013.01); *H04L 9/3218* (2013.01); *H04L 9/3247* (2013.01); *H04L 9/3278* (2013.01); *H04W 12/63* (2021.01)

(58) Field of Classification Search
None
See application file for complete search history.

(56) References Cited

U.S. PATENT DOCUMENTS

| | | | |
|---|---|---|---|
| 8,150,767 B2 | 8/2012 | Wankmueller | |
| 8,924,301 B2 | 12/2014 | Lindelsee et al. | |
| 9,355,391 B2 | 5/2016 | von Behren | |
| 2004/0123156 A1* | 6/2004 | Hammond, II | H04L 63/08 726/4 |
| 2012/0054487 A1 | 3/2012 | Sun et al. | |
| 2013/0268759 A1* | 10/2013 | Blankenbeckler | G06F 21/10 713/168 |
| 2015/0120472 A1 | 4/2015 | Aabye | |
| 2015/0254642 A1 | 9/2015 | Bondesen et al. | |
| 2017/0048218 A1* | 2/2017 | Lindemann | H04L 63/0853 |
| 2017/0093784 A1* | 3/2017 | McKay | G06Q 50/01 |

(Continued)

FOREIGN PATENT DOCUMENTS

WO    2020076854 A2    4/2020

OTHER PUBLICATIONS

Felicetti, C., et al., Aug. 2021. Exploiting Silicon Fingerprint for Device Authentication Using CMOS-PUF and ECC. In 2021 IEEE International Conference on Smart Internet of Things (SmartIoT) (pp. 229-236). IEEE. (Year: 2021).*

(Continued)

*Primary Examiner* — Luu T Pham
*Assistant Examiner* — Edward X Long
(74) *Attorney, Agent, or Firm* — Caldwell Intellectual Property Law

(57) ABSTRACT

A system for cryptographic authorization of wireless communications includes a verifying node and configured to receive a transfer request from a user device, authenticate the transfer request, generate a transfer authorization token, and provide the transfer authorization token to at least one recipient device.

18 Claims, 4 Drawing Sheets

(56) References Cited

U.S. PATENT DOCUMENTS

2017/0178124 A1* 6/2017 Havilio ............... G06Q 20/382
2017/0200155 A1   7/2017 Fourez et al.
2017/0289134 A1* 10/2017 Bradley .............. H04L 63/105
2017/0308873 A1  10/2017 Kassemi et al.
2019/0332746 A1  10/2019 Thomas
2019/0370504 A1* 12/2019 Edwardsson .......... G06F 21/86

OTHER PUBLICATIONS

Chatterjee, B. et al., Apr. 2018. RF-PUF: IoT security enhancement through authentication of wireless nodes using in-situ machine learning. In 2018 IEEE international symposium on hardware oriented security and trust (HOST) (pp. 205-208). IEEE. (Year: 2018).*

International Search Report; PCT/US21/29628; dated Jul. 27, 2021; By: Authorized Officer: Shane Thomas.

* cited by examiner

SYSTEMS AND METHODS FOR CRYPTOGRAPHIC AUTHORIZATION OF WIRELESS COMMUNICATIONS

CROSS-REFERENCE TO RELATED APPLICATIONS

This application claims the benefit of priority of U.S. Provisional Patent Application Ser. No. 62/841,934, filed on May 2, 2019, and titled "SYSTEMS AND METHODS FOR PEER-TO-PEER ASSET TRANSACTIONS USING TRUSTED HARDWARE," which is incorporated by reference herein in its entirety.

FIELD OF THE INVENTION

The present invention generally relates to the field of computer security and device authentication in distributed computing systems. In particular, the present invention is directed to systems and methods for cryptographic authorization of wireless communications.

BACKGROUND

In certain peer-to-peer wireless communications, devices such as phones, smart watches, tablets, computers, or the like, may be used to conduct transfers with wireless terminals. However, flexible and secure authentication to support such transfers is lacking.

SUMMARY OF THE DISCLOSURE

In an aspect, a method of cryptographic authorization of wireless communications includes receiving, at a verifying node, a transfer request from a user device, authenticating, by the verifying node, the transfer request, generating, by the verifying node, a transfer authorization token, and providing, by the verifying node, the transfer authorization token to at least one recipient device.

In another aspect, a system for cryptographic authorization of wireless communications includes a verifying node and configured to receive a transfer request from a user device, authenticate the transfer request, generate a transfer authorization token, and provide the transfer authorization token to at least one recipient device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
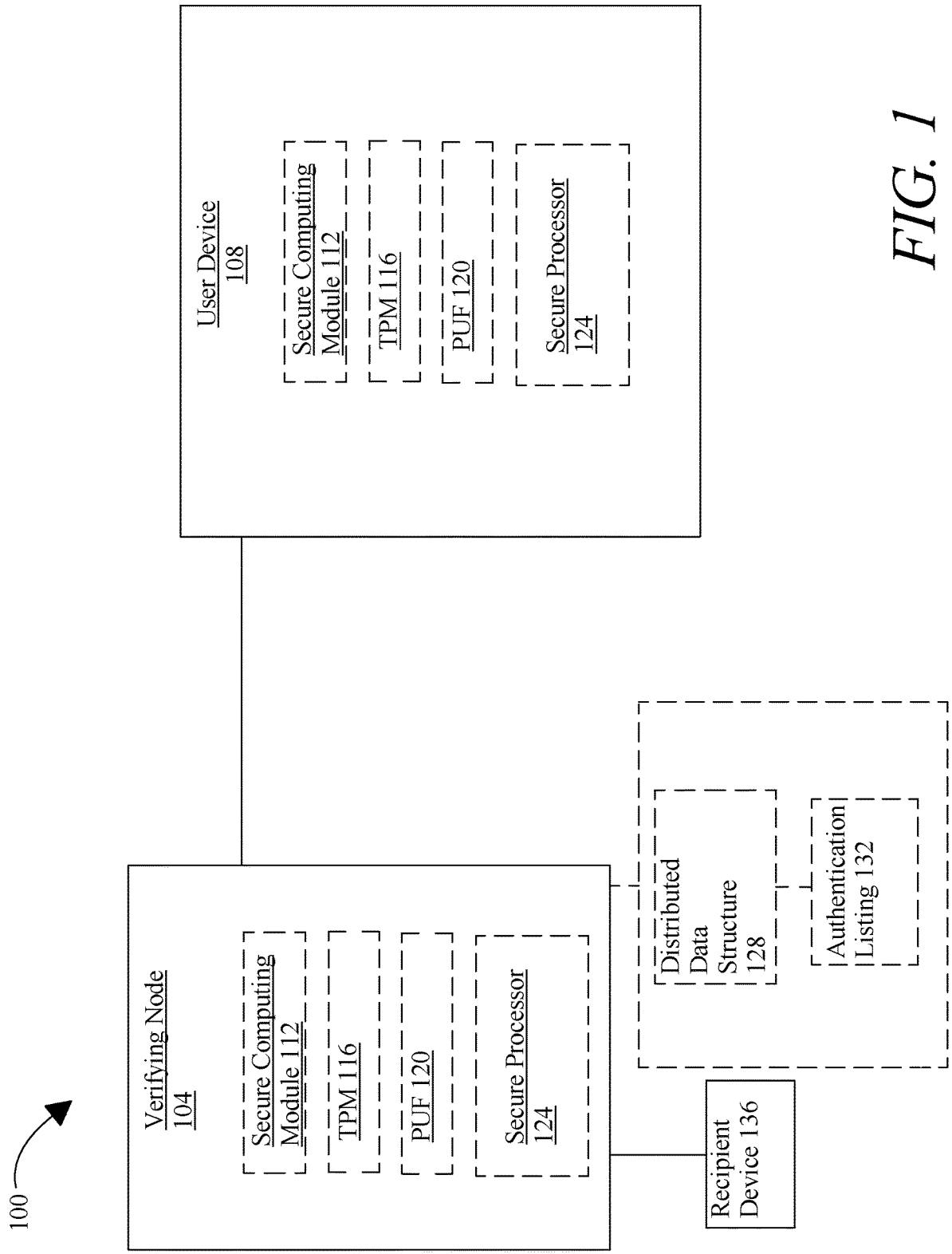
FIG. 1 is a block diagram illustrating an exemplary embodiment of a system for peer-to-peer asset transfers using trusted hardware.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for peer-to-peer asset transfers using trusted hardware. In an embodiment, a peer-to-peer asset transfer from a user device to a recipient device may be initiated at a verifying node by receiving an asset transfer request from a user device. The asset transfer request may then be authenticated by the verifying node by authenticating certain aspects of a user device, such as for example by calculating confidence levels in the user device and calculating heuristics of trust. Authenticating may also include checking the status of a user device contained on an authentication listing and/or revocation listing. After the asset transfer request has been authenticated, the verifying node generates a transfer authorization token. The transfer authorization token may define the terms for the asset transfer and include identifying information of the user device and/or the recipient device as well as the asset transfer amount. The transfer authorization token may be time limited and may expire after a certain amount of time if certain conditions are not met. Once generated, the transfer authorization token may be provided to at least one recipient device.

Systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance, a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for implementing peer-to-peer asset transfers using trusted hardware is illustration. System 100 includes a verifying node 104. A verifying node 104 as used herein includes any computing device as described below in reference to FIG. 4. A verifying node 104 may include a single computing device operating independently, or may include two or more computing devices operating in concert, in parallel, sequentially or the like. A verifying node 104 may incorporate, be in communication with, or otherwise utilize a secure computing module as described below in further detail. System 100 may include multiple verifying nodes 104 that may be acting simultaneously using threshold cryptography.

With continued reference to FIG. 1, a verifying node 104 may communicate with one or more user devices 108. In an embodiment, a verifying node 104 may communicate with one or more user devices 108 through a communication network. Connection to communication network may include connection via a network interface card (e.g., a mobile network interface card, a LAN card), a modem, any other wired or wireless means usable for connection to a communication network, and/or any combination thereof. A communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. A verifying node 104 may be designed and configured to perform any method step or steps as disclosed herein, in any order or combination, and with any degree of repetition; as a non-limiting example, a verifying node 104 may be designed and configured to receive an asset transfer request from a user device, authenticate the asset transfer request, generate a transfer authorization token, and provide the transfer authorization token to at least one recipient device.

With continued reference to FIG. 1, any verifying node 104 may include a secure computing module 112. As used herein, a secure computing module 112 is a hardware element configured to perform one or more secured operations beyond the control of other circuit elements or software, whether incorporated with the secure computing module 112 in a circuit or computing device, or a part of an extrinsic computing device. As a result, at least one secured operation performed by secure computing module 112 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 112 and/or a system or computing device incorporating secure computing module 112 based on the above-described set of assumptions. As a non-limiting example, a secure computing module 112 designed to produce an expected result despite all software-only attacks may give rise to a first confidence level, whereas another secure computing module 112 designed to produce its expected result in the face of all software or hardware attacks may give rise to a second confidence level; the second confidence level may be higher, owing to the reduced probability that the second secure computing module 112 would be compromised.

Still viewing FIG. 1, secure computing module 112 may include a trusted platform module (TPM 116). In an embodiment, a TPM 116 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 116 may have any suitable elements of digital or analog circuitry usable to perform one or more processes as described herein, including without limitation processes used to determine confidence levels and/or authenticate digitally signed assertions as described below. TPM 116 may have memory and/or other logic and/or a processor in its own right which may be in a non-limiting example a crypto-processor. TPM 116 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 112 may include at least PUF 120. PUF 120 may be implemented by various means. In an embodiment, PUF 120 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 120 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 120 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 120 in an embodiment include without limitation buskeeper PUFs, which may be similar to other PUFs based on bistable memory elements but leveraging buskeeper cells. PUF 120 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 120 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 120 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 120 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 120 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to atto-second range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 120 that may be used may include, without limitation, nano-electromechanical (NEM) PUFs. NEM PUFs may include PUFs that leverage stiction of a silicon nanowire to a binary gate structure. NEM PUFs may include those based on interfacial magnetic anisotropy energy, such as use of the random distribution of magnetization orientation originating from the sub-nanometer variation of oxide layer produced by the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 120 and/or TPM 116; such outputs may be used to generate symmetric or asymmetric keys, private keys, zero-knowledge proofs, or other proofs of authenticity, as described in further detail below.

Continuing to refer to FIG. 1, secure computing module 112 may implement one or more secure memory storage protocols. One or more secure memory storage protocols may be protocols designed to prevent unauthorized access to memory and/or to protect secure computing module 112 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 112. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 112 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 112 may use hardware-enabled access control to protect memory access; hardware access control may, as a non-limiting example, be performed by tagging each memory entry with a "container identifier" corresponding to a page, file, or other grouping of memory, enabling secure computing module 112 to determine whether tampering has occurred.

Secure computing module 112 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 112 may operate using one or more dedicated memory objects, registers, or storage elements; as a non-limiting example, secure computing module 112 may operate with dedicated cache lines not available to other processes or circuits, preventing, e.g., stack or buffer overrun attacks to corrupt or steal data. Dedicated memory elements may be wired only to secure computing module 112; access to dedicated memory elements may be rendered impossible except by way of secure computing module 112. Secure computing module 112 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 112 may utilize oblivious random-access memory (RAM) wherein memory access patterns are obfuscated to prevent detection of memory access patterns by outside observers attempting to deduce execution details regarding processes performed using secure computing module 112. Secure computing module 112 and/or device incorporating secure computing module 112 may incorporate a trusted non-volatile storage device that provides some means of verification of secure storage capability and other properties. Memory protocols as described above may be used to implement methods of attested storage and the chain of trust beginning at PUF 120 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 112.

Still referring to FIG. 1, secure computing module 112 may include a secure processor 124. Secure processor 124 may be a processor as described below in reference to FIG. 4. Secure processor 124 may operate autonomously from other processors and/or an operating system operating on at least a cryptographic evaluator; for instance, secure processor 124 may store entries in temporary or long-term memory in encrypted form, where decryption is impossible without private keys not available to devices, circuits or software besides secure processor. Encryption may likewise be impossible without private keys available only to secure processor 124. Secure processor 124 may also digitally sign memory entries using, for instance, a private key available only to secure processor 124. Keys available only to secure processor 124 may include keys directly encoded in hardware of the secure processor 124; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor 124 may be constructed, similarly to TPM 116, to frustrate alteration and/or probing to discover and/or alter private keys. Private keys may be demonstrable as uniquely associated with secure processor 124 by use of PUF 120 as described above; secure processor 124 may include, for instance, a TPM 116 as described above. Alternatively or additionally, a certificate authority as described above, which may be a manufacturer of secure processor 124, may verify that one or more public keys are associated uniquely with secure processor 124 according to any protocol suitable for digital certificates.

Further referring to FIG. 1, any computing device described in this disclosure may be configured to generate digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Continuing to refer to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and continuing to refer to FIG. 1, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, and continuing to refer to FIG. 1, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Nonprovisional application Ser. No. 16/682, 809, filed on Nov. 13, 2019, and entitled "METHODS AND SYSTEMS FOR IMPLEMENTING AN ANONYMIZED ATTESTATION CHAIN," the entirety of which is incorporated herein by reference.

In some embodiments, and still referring to FIG. 1, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, and further referring to FIG. 1, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, and continuing to refer to FIG. 1, persons, devices, or transfers may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, and still referring to FIG. 1, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 112 as described in further detail below; in such scenarios, authentication may include proof by the secure computing module 112 that the secure computing module 112 possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Continuing to refer to FIG. 1, certificate authority may be implemented in a number of ways, including without limitation as described in U.S. Nonprovisional application Ser. No. 16/680,787, filed on Nov. 12, 2019, and entitled "METHODS AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Non-provisional application Ser. No. 16/680,787.

Still referring to FIG. 1, digital signatures may be generated using a secure computing module 112. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a remote device and/or secure computing module 112 may convert immediate output from PUF 120 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a remote device and/or secure computing module 112 may extract one or more random numbers based on a PUF 120 output to create a symmetric key as described above. Alternatively or additionally, extraction may include extraction of a private key of a public key cryptographic system.

With continued reference to FIG. 1, key extraction may include use of a number output by a PUF 120 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 120; steps along a chosen elliptic curve may then be performed using random number to generate a public key. Initial point on elliptic curve and elliptic curve may be selected using an additional random numbers, which may be generated using any suitable method; random numbers associated with curves having known vulnerabilities may be discarded, according to mathematical descriptors or other characteristics of such vulnerabilities as stored in memory of or accessible to at least a remote device and/or secure computing module 112. Persons skilled in the art, upon reading the entirety of this disclosure, will be aware of various ways in which a random number may be used to generate a private and public key pair consistently with this disclosure.

Still viewing FIG. 1, Key extraction may utilize a numerical output from a PUF 120 or other element of secure computing module 112 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 120 and/or elements of secure computing module 112 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 1, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 112 may act as a "first signer" of a digital signature, signing with a private key produced from a secret generator as described above. In an embodiment secure computing module 112 signs an element of data using the private key. A second signer, which may be secure computing module 112 and/or an additional element coupled thereto, may previously or subsequently sign the element of data or another element linked to the element previously signed; alternatively or additionally, second signer may use information or signature elements provided by secure computing module 112 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

With continued reference to FIG. 1, secure computing module 112 may implement one or more methods of attested computation. Attested computation may include or involve one or more methods to ensure that computation of a program, known as an attested program, is trusted and signed by secure computing module 112 and/or computing device incorporating secure computing module 112; this may be supported by means to assert the state of the system memory, code, and input data. In an embodiment, attested computing may include or involve one or more methods to authenticate a boot loader. An authenticated boot loader may include a first code that the secure computing module 112 may run upon system initialization and is responsible for checking the measurements and/or signatures of subsequent components either locally or by utilizing a piece of trusted hardware such as a TPM 116. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric key based upon the trusted software component's hash. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component, so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, and still referring to FIG. 1, secure computing module 112 and/or a computing device incorporating secure computing module 112 may compute a cryptographic hash of a system state when performing a trusted computation. System state may include, without limitation, program code and/or one or more elements of data being computed. A resulting cryptographic hash of system state may be stored in one or more trusted or secured memories as described above. Secure computing module 112 and/or computing device incorporating secure computing module 112 may append a cryptographic signature based upon any private key that may be associated with secure computing module 112 as described herein. Secure computing module 112 and/or computing device incorporating secure computing module 112 may operate a security reset of working memory prior to load of data for trusted computation; for instance, the secure computing module 112 and/or computing device incorporating secure computing module 112 may append a hash of the memory to cryptographic hash of system state following reset and prior to loading data. Secure computing module 112 and/or computing device incorporating secure computing module 112 may append its authentication signature of memory page tables and/or memory tables. Upon completion of the trusted computation, which may include execution of program code of system state, secure computing module 112 and/or computing device incorporating secure computing module 112 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 112. Secure computing module 112 and/or computing device incorporating secure computing module 112 may include a system to compute one or more hash trees of cryptographic hash of the computation, system state, and/or outputs; secure computing module 112 and/or computing device incorporating secure computing module 112 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of a secure computing modules 112 may include, without limitation, TPM 116 as described above. The secure computing module 112 may include TPM 116 combined with a boot-measuring protocol using hash trees, Merkle trees, or the like to measure boot entries to create an "attested boot," additionally or separately from the attested computation description described above. A secure computing module 112 may include a trusted execution technology (TXT) module combining a TPM 116 with establishment of a secure container at run-time; secure container may be isolated from a software stack and OS of at least the transaction authentication node 104 and/or use TPM 116 to measure and attest to secure container prior to launch. Secure computing module 112 may implement a trusted enclave, also known as a trusted execution environment (TEE) or secure enclave. In an embodiment, a trusted enclave may be a portion of a computing device that is isolated from the main processor of the computing device. Isolation may be achieved using elements of secure computing module 112 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 112 from CPU and/or input/output devices or connections. Inputs and outputs to and from trusted enclave may be restricted and controlled tightly by a secure processor and/or TPM as described above, including software security monitors. Trusted enclaves may be considered protected memory primitives in which the program stack and stack pointer are reset prior to loading of code into the enclave, and flushed prior to exiting trusted enclave operation. In general, trusted enclaves may be defined as hardware or software primitives that prohibit unauthorized access to memory segments during execution of sensitive code, including via access to processor caches. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. The Sanctum architecture and Ascend secure infrastructure from MIT, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., and/or any other suitable architecture. Persons skilled in the art, upon reviewing the entirety of this disclosure, will be aware of various additional or alternative trusted computing processes that may be used to implement secure computing module 112, TEE, or trusted enclaves as disclosed herein. System 100 may incorporate or communicate with a certificate authority.

With continued reference to FIG. 1, one or more user devices 108 may include hardware containing (i.e. inherently containing) a secret used to create secure proof that generates an asset transfer request, such as a hardcoded digital signature circuit, PUFs, key extractors or the like. User device 108 may be any device that generates an asset transfer request. User device 108 may be a computer, a user laptop, a user smart-phone, a user tablet, a user mobile device, and/or a user kiosk. User device 108 may be solely owned and/or operated by a user. User may be a human being, corporation, sole proprietorship, partnership, limited liability corporation, financial institution, bank account, merchant, bank, and any combination thereof. In an embodiment, user device 108 may include a single device that performs an entire asset transfer, in other words user device 108 may include a verifying node 104. In an embodiment, a user device 108 may not perform an entire asset transfer, for example when a user device 108 provides an asset transfer request to a verifying node 104 distinct from and/or not located on a user device 108. An asset transfer request may include any information necessary to perform an asset transfer from a user device to a recipient device. An asset may include but is not limited to tangible or intangible assets such as but not limited to money, currency, digital funds, digital currency, coins, legal tender, funds, bills, money orders, wire transfers, and/or cryptocurrency. An asset transfer request may include payment method data. Payment method data may include information pertaining to the asset transfer, such as the amount of money to be transferred, user payment information such as credit card number, bank account number, quick response code (QR) for cryptocurrency payments, and/or information pertaining to a recipient such as recipient bank account routing number where an asset will be transferred to. In an embodiment, method of payment such as a user credit card may be located and stored on a user device, such as for example, a credit card located in a digital wallet found on a user device 108. One or more user devices 108 may be designed and configured to perform any method step or steps as disclosed herein, in any order or combination, and with any degree of repetition; as a non-limiting example a user device 108 may receive a user request for an asset transfer from a user, authenticate user credentials, generate an asset transfer request as a function of user input, and provide the asset transfer request to a verifying node.

With continued reference to FIG. 1, an asset transfer request may include authentication credentials from a user. User authentication credentials may include at least an authentication datum supplied by a user that aids in identifying user. An authentication datum may be a knowledge factor such as a password that only user knows and only user is able to enter when prompted. Other knowledge factors may include a passphrase and/or personal identification number (PIN). Authentication datum may also be a possession factor, whereby authentication is demonstrated when user proves possession, such as possession of a security token. Authentication datum may also be demonstrated by a biometric authentication of a user. As used in this disclosure, "biometric" refers to a unique biological pattern derived from a measurable biological characteristic of a biological sample, which is used for recognition and verification. A biological characteristic may include physiological or anatomical characteristics, including without limitation characteristics detectable by scanning or otherwise analyzing a person's face, palm, vein, fingerprint, iris, retina, hand geometry, finger geometry, tooth shape, ear shape, olfactory characteristics, electrical characteristics, and/or DNA. A biological characteristic may include cardiovascular parameters including heart rate, heart rate variability (HRV), characteristics of the electrocardiogram, blood pressure parameters, characteristics related to autonomic nervous system state, including galvanic skin response (GSR), pupillary response, pupil dilation, pulsatile changes inferable from measurements of the eye or face, including without limitation using Eulerian Video Magnification or other techniques. A biological characteristic may further include neurological state, as detectable via changes in concentrations of oxygenated and deoxygenated hemoglobin, measure of redox states of cytochromes or other correlates of neural activity obtainable via noninvasive means, electroencephalogram (EEG), electromyography (EMG), or other electrical changes related to neural activity, extracellular recordings of neurons, including without limitation via implanted depth electrodes, electrocorticogram (ECoG) via subdural, epidural, and other methods known to those skilled in the art. A biological characteristic may also include behavioral characteristics such as speech, voice, signature, keystroke, gait, eye saccade or other eye movements. The biological characteristics are captured by a biometric sensor that is able to detect a biological sample.

As used in this disclosure, a biometric sensor may refer to a device that is configured to capture a unique biometric pattern from at least a biological sample. A biometric sensor may include a face scanner, palm scanner, vein scanner, fingerprint scanner, iris scanner, retina scanner, hand geometry scanner, finger geometry scanner, tooth shape scanner, radiographic dental image scanners, ear shape scanner, olfactory scanner, deoxyribonucleic acid (DNA) scanner or analyzer, speech scanner, voice scanner, voice recognition microphones, static signature recognition, dynamic signature recognition, keystroke dynamics recorder, and/or devices to perform movement signature recognition and/or record gait energy images. Biometric sensors may further include a blood pressure monitors, electrocardiogram sensors, video capture devices with appropriate post-processing (for instance for Eulerian Video Magnification or other signal processing methods to infer biometric parameters from video), pulse oximetery sensors, functional near-infrared spectroscopy systems, sensors of skin resistance, conductance, impedance and/or capacitance, external or implantable neural or neuromuscular electrodes, implanted cardiac electrodes and/or any other implanted sensor of electromagnetic, capacitive, inductive or galvanic parameters, and related sensors or sensor arrays. A biometric sensor may incorporate other tools and technologies such as optical imaging, ultrasonic imaging, and capacitance imaging which will be described in more detail below. Measurement of these parameters may be conducted via any means known to those skilled in the art, including in non-limiting examples optical measurement of the face and/or eye, for instance to detect pulsatile changes to the pupil diameter or other parameter, or in the case of a device incorporated into eyewear, an augmented reality (AR) system, a virtual reality (VR) system, a contact lens, or the like. In an embodiment, a verifying node 104 may receive an authentication datum generated from a biometric scan of a user's iris. In an embodiment, two or more authentication datums may be supplied to order to identify a user. For example, user identity may be authenticated by providing a password and by a scan of user's palm; authentication may include any combination of at least a knowledge factor, at least a possession factor, and/or at least a biometric. In yet another non-limiting example, user identity may be authenticated by two biometric authentication datums, for example a voice recognition authentication and a fingerprint scan. Payment method data may also be encrypted and/or be generated as a secure proof, which is described in more detail below in reference to FIG. 3.

Continuing to refer to FIG. 1 distributed data structure 128 may be implemented by a plurality of verifying nodes 104. In an embodiment, a plurality of verifying nodes 104 implementing distributed data structure 128 may allow for multiple asset transfers to occur simultaneously. In an embodiment, an asset transfer at a first verifying node 104 may occur while at the same time a second asset transfer may occur at a second verifying node 104. In an embodiment, a plurality of verifying nodes 104 may provide additional levels of security by having additional verifications of users. In an embodiment, having a plurality of verifying nodes 104 implementing distributed data structure 128 may also allow for simultaneous updates from an institution and allow an institution to generate an approval for more than one verifying node 104.

Continuing to refer to FIG. 1, a verifying node 104 may be configured to provide a transfer authorization token to at least one recipient device 136. A recipient device 136 as used herein is any device that receives an asset transfer. A recipient device 136 may be a computer, a laptop, a smartphone, a tablet, a mobile device, and/or a kiosk. In an embodiment, a recipient device 136 may be a user device 108. A recipient device 136 may be a device owned and/or operated by a recipient, to whom a user may be transferring assets. Recipient may be or include a human being, corporation, sole proprietorship, partnership, limited liability corporation, financial institution, bank account, merchant, bank, and any combination thereof. A transfer authorization token may be used to confirm authentication of user device 108 and allow an asset transfer to proceed and be delivered to at least one recipient device, as described in more detail below in reference to FIG. 3. One or more recipient devices 136 may be designed and configured to perform any method step or steps as disclosed herein, in any order or combination, and with any degree of repetition; as a non-limiting example a recipient device 136 may be designed and configured to receive a transfer authorization token, store the transfer authorization token, and generate a payment to the recipient device and/or to a user thereof as a function of the transfer authorization token. As a non-limiting example, an authorization token may take any form suitable for use as an authorization token as described in U.S. Nonprovisional application Ser. No. 16/680,787.

Further referring to FIG. 1, a distributed data structure may be implemented using a "secure listing," as used in this disclosure, is a data structure including digitally signed assertions, credentials, and/or authentication tokens, where "including" an element of data signifies containing the element itself and/or a representation thereof such as a cryptographic hash, Merkle root, or the like, such that inclusion or "membership" in the secure listing can be proven. Membership in the secure listing may be revoked, in non-limiting example a secure listing may define the set of non-revoked members within a given temporal epoch. In non-limiting example, Membership may be proven by demonstrating that a member is not on a revocation list by means of secure proof or any method known to those skilled in the art. A secure listing may include a cryptographic accumulator. A "cryptographic accumulator," as used in this disclosure, is a data structure created by relating a commitment, which may be smaller amount of data that may be referred to as an "accumulator" and/or "root," to a set of elements, which may include without limitation textual elements, authentication tokens, digitally signed assertions, and/or credentials, together with membership and/or nonmembership proofs for any element in the set. In an embodiment, these proofs may be publicly verifiable against the commitment. A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. For instance, a cryptographic accumulator may be implemented as a Merkle tree and/or hash tree, in which each accumulated element created by cryptographically hashing a lot of data. Two or more accumulated elements may be hashed together in a further cryptographic hashing process to produce a node element; a plurality of node elements may be hashed together to form parent nodes, and ultimately a set of nodes may be combined and cryptographically hashed to form root. Contents of root may thus be determined by contents of nodes used to generate root, and consequently by contents of accumulated elements, which are determined by contents of lots used to generate accumulated elements. As a result of collision resistance and avalanche effects of hashing algorithms, any change in any lot, accumulated element, and/or node is virtually certain to cause a change in root; thus, it may be computationally infeasible to modify any element of Merkle and/or hash tree without the modification being detectable as generating a different root. In an embodiment, any accumulated element and/or all intervening between accumulated element and root 308 may be made available without revealing anything about a lot of data used to generate accumulated element.

Continuing to refer to FIG. 1, a secure listing may include a zero-knowledge set. A "zero-knowledge set," as defined in this disclosure, is a set of elements of textual data such as strings, to which a prover may commit such that after commitment the prover can prove, for any textual datum, whether the textual datum is or is not in the set without revealing any knowledge about the set and/or any element thereof beyond the verity of such membership assertions.

Continuing to refer to FIG. 1, a secure listing may include a range proof, defined for purposes of this disclosure as a set-membership proof with respect to a set that is a sequence of values on a range between upper and lower bounds, such as an open or closed set on the real number line or the like.

Still referring to FIG. 1, a secure listing may include a temporally sequential listing, which may include any set of data used to record a series of at least a digitally signed assertion in an inalterable format that permits authentication of such at least a digitally signed assertion. In some embodiments, secure listing records a series of at least a digitally signed assertion in a way that preserves the order in which the at least a digitally signed assertion took place. Secure listing may be accessible at any of various security settings; for instance, and without limitation, secure listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Figure 2:
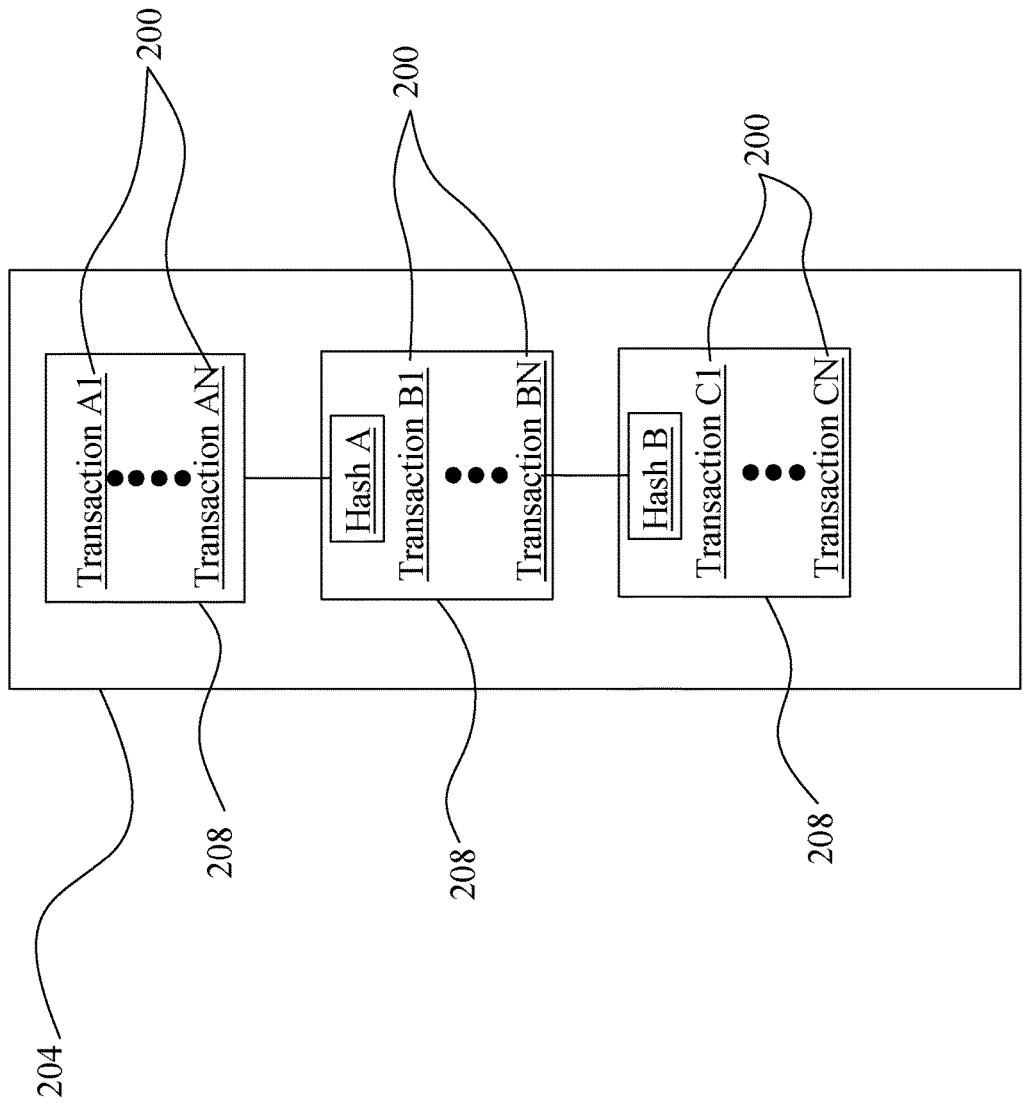
FIG. 2 is a block diagram of an exemplary embodiment of a temporally sequential listing.

Referring now to FIG. 2, system 100 and/or elements of system 100 may be used to perform one or more processing steps necessary to create, maintain, and/or authenticate a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. In an embodiment, a first digitally signed assertion may be generated using a hardcoded digital circuit. In an embodiment, a first digitally signed assertion which identifiers verifying node 104 may be generated through the use of a PUF 120. In an embodiment, PUF 120 may create a digital fingerprint that uniquely identifies verifying node 104. In an embodiment, PUF 120 used as trusted hardware to identify verifying node 104 may employ cryptographic measures including generation of public and/or private keys. In an embodiment, a first digitally signed assertion may be generated using trusted computing and may involve direct anonymous attestation (DAA) and remote attestation. In an embodiments generation of a first digitally signed assertions may also involve unique object fingerprint (UNO). In an embodiment, a first digitally signed assertion may include a verification datum related to secure proof; verification datum may be any datum usable to verify authenticity of secure proof. As a non-limiting example, verification datum may include a public key associated with a private key used to sign a digital signature, or a datum usable to evaluate a zero-knowledge proof. At least a digitally signed assertion 200 may be signed by a digital signature created using the private key associated with the owner's public key, as described above. For instance, at least a digitally signed assertion 200 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a verified storage node as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. In an embodiment, the temporally sequential listing may be a directed acyclic graph (DAG), in which multiple branches may be generated on or by different devices implementing temporally sequential listing 204, and branches may be merged into one another, while a hash chain or similar structure ensures that branches cannot go "back in time" whether merged or not; secure timestamps and/or attested time may be further included to impose a temporal order on a DAG or other temporally sequential listing 204. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP_RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 6. For example, and without limitation, at least a digitally signed assertion 200 may include one or more encrypted or otherwise secured or partitioned memory entries as entered for instance using a secure computing module 108 or according to a secure computing protocol as described in further detail below.

Referring again to FIG. 1, in some embodiments, secure computing module 112 and/or verifying node 104 may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 112, man in the middle or other attacks.

Still referring to FIG. 1, one or more verifying nodes 104 may include a distributed storage instance. A distributed storage instance, as used herein, may include any locally stored portion or copy of a data structure used in distributed storage. Distributed storage instance may include a copy of a temporally sequential listing 204, one or more sublistings 208, and/or a reference to a temporally sequential listing 204 or sublisting 208; distributed storage may include a sufficient link to or portion of temporally sequential listing 204 to permit a distributed storage node including to participate in one or more protocols for generating or recording digitally signed assertions 200, creating sub-listings 208, and/or authenticating digitally signed assertions 200, sublistings 208, and or temporally sequential listing 204 as describe above. Distributed storage instance 208 may include a local portion or link to any suitable distributed storage data structure, including without limitation a distributed hash table or the like.

With continued reference to FIG. 1, a verifying node 104 may be configured to record one or more records to a distributed data structure 128 and/or an instance thereof. A distributed data structure 128 may include a temporally sequential listing as described in more detail in FIG. 2. A distributed data structure may include an authentication listing 132, as described in more detail below. A distributed data structure may be utilized to record any set of data generated by elements or computing devices of system 100 in an inalterable format that permits authentication of such entry and may serve as a form of memory storage. Distributed data structure 128 may be accessible at any of various security settings; for instance, and without limitation, the distributed data structure 128 may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. A verifying node 104 may grant certain access privileges to a user device 108, a recipient device 136, and/or a verifying node 104. In an embodiment, verifying node 104 may be granted different access privileges to system 100. Access privileges may exist in more than one level, including, without limitation, a first access level or community of permitted entities and/or devices having ability to read, and a second access level or community of permitted entities and/or devices having ability to write; first and second community may be overlapping or non-overlapping. Distributed data structure 128 may include for example, a temporally sequential listing as described in more detail above in reference to FIG. 2. Distributed data structure 128 may, for instance be encrypted, and decryption keys may be distributed only to devices authorized to participate in authentication as described herein. In an embodiment, decryption key may be stored by transaction authentication nodes as described in further detail below. Exemplary embodiments of temporally sequential listing, which may include embodiments of distributed data structure 128, are described in more detail above in FIG. 2.

An authentication listing 132 may include any suitable listing of records identifying a user device 108 and may include a distributed data structure 128 as described above. An authentication listing 132 may include verification data usable to verify secure proofs used in any embodiment of system 100 or methods as described herein. Authentication listing 132 may include secure timestamps or other temporal information, including information of or usable to verify or authenticate a time-limited transfer authorization token as described in more detail below. An instance of an authentication listing 132 may include a sufficient link to or portion of a temporally sequential listing 204 to permit a user device 108 including the instance to participate in one or more protocols for generating or recording digitally signed assertions 200, creating sub-listings 208, and/or authenticating digitally signed assertions 200, sublistings 208, and or temporally sequential listing 204 as describe above. Authentication listing 132 may change frequently as devices may be authenticated or verified, and/or as nodes are authentication or verified, and as such may be updated frequently to reflect such activity; a device or group of devices updating authentication listing 132 may update a local instance of the authentication listing 132 and then provide the update and/or local instance to other devices in system 100. In an embodiment, an authentication listing 132 may include a listing including status of verifying nodes 104. This may include information pertaining to if a verifying node 104 still has permission to authenticate and perform asset transfers.

Figure 3:
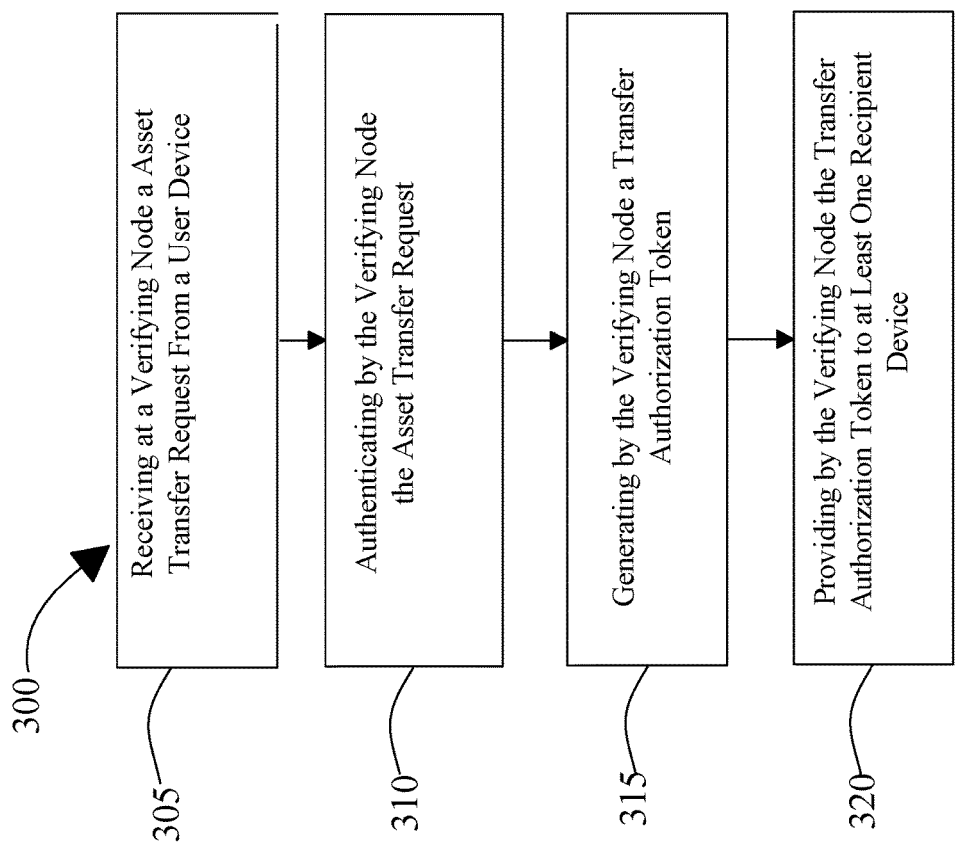
FIG. 3 is a flow diagram illustrating an exemplary embodiment of a method for peer-to-peer asset transfers using trusted hardware.

Referring now to FIG. 3, an exemplary embodiment of a method 300 of implementing peer-to-peer asset transfers using trusted hardware is illustrated. At step 305, a verifying node receives an asset transfer request from a user device. An asset transfer request may include any information necessary to perform an asset transfer from a user device to a recipient device as described in more detail above in reference in FIG. 1. An asset may include but is not limited to tangible or intangible assets such as but not limited to money, currency, digital funds, digital currency, coins, legal tender, funds, bills, money orders, wire transfers, and/or cryptocurrency. Receiving an asset transfer request from a user device 108, may include receiving an asset transfer request directly or indirectly; for instance, a user device 108 may relay an asset transfer request via other verifying nodes 104 connected to the network, or record it in a file, a distributed data structure 128, authentication listing 132, and/or other instance. Indirectly or directly received communications from a user device 108 may include one or more secure proofs, payment method data, and/or user authentication credentials as described in further detail below.

With continued reference to FIG. 3, an asset transfer request may include a key linked to a user device 108. A key linked to a user device 108 may include a public key associated with a private key as a cryptographic pair. A public key may be a key in which may be disseminated widely in system 100 and may be used for encryption, and to verify that a holder of the corresponding private key sent a transmission, such as a message. A private key may not be widely disseminated but rather may be held by a user device 108 and may be used to decrypt a transmission. In an embodiment, a key linked to a user device 108 may be generated from a PUF 120 generated by a user device 108, whereby an immediate output from a PUF 120 may convert into a key in the form of a binary number. This may be performed, without limitation, using a fuzzy extractor, such as those used to convert slightly variable signals from biometric samples or the like predictably into keys by having certain variation tolerances in the binary encoding process. Private key generation may utilize corrective measures such as machine learning, neural networks, convolutional neural networks and the like, or other approaches to provide error correction over the operating temperature range of a user device 108, to ensure consistency in key generation. Private key generation may alternatively or additionally incorporate true random number generator(s) (TRNGs), pseudorandom number generators (PRNGs) and related devices. Key generation may include generation of a symmetric key; for instance, one or more random numbers based on PUF 120 may output to create a symmetric key as described above. Alternatively or additionally, generation may include generation of a private key of a public key cryptographic system.

With continued reference to FIG. 3, receiving an asset transfer request from a user device may include receiving a secure proof from user device 108. A secure proof, as used herein, is a protocol whereby an output is generated that demonstrates possession of a secret, such as a secret stored in or produced by secure computing module 112 and/or PUF 120, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange. Identifier may be specific to a user device 108; alternatively or additionally, identifier may include a group identifier and/or signature or secure proof generated by a group key and/or secret as described above, identifying a user device 108 through an anonymizing process such as without limitation DAA.

With continued reference to FIG. 3, secure proof may include a digital signature. In an embodiment, digital signature may be any digital signature as described above; digital signature may be created by signing a mathematical representation of first dataset. In an embodiment, a user device 108 may generate a key to be used in producing digital signature using secure computing module 112. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, a user device 108 and/or secure computing module 112 may convert immediate output from PUF 120 into key in the form of a binary number. In non-limiting example, PUF 120 may utilize at least a TRNG or other entropy source to provision an N bit secret vector $\vec{s}$ that is hashed via a cryptographic one-way function, in non-limiting example SHA256, SHA3 or the like, to create a seed for a key derivation function (KDF), in non-limiting example ED25519, generating at least a public/private key pair. At least a PUF 120 may, in a non-limiting example, output an M bit vector $\vec{e}$ (or a subset of PUF 120 output is truncated, multiple PUF outputs may be concatenated, or any combination thereof) which, combined with a public M×N bit matrix A and potentially public helper vector $\vec{b}$ satisfies the equation $\vec{b} = A\vec{s} + \vec{e}$. such that PUF output $\vec{e}$ and public helper data $\vec{b}$ and matrix A may be used to regenerate at least a secret $\vec{s}$. In an embodiment, bits of $\vec{e}$ that may be be considered unstable or otherwise undesireable for purposes or stable regeneration may be discarded, resulting in associated reduction in length of $\vec{b}$ and A. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Extraction may include extraction of a symmetric key; for instance, a user device 108 and/or secure computing module 112 may extract one or more random numbers based on a PUF 120 output to create a symmetric key as described above. Alternatively or additionally, extraction may include extraction of a private key of a public key cryptographic system.

Still referring to FIG. 3, key extraction may include use of a number output by a PUF 120 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 120; steps along a chosen elliptic curve may then be performed using random number to generate a public key. Initial point on elliptic curve and elliptic curve may be selected using an additional random number, which may be generated using any suitable method; random numbers associated with curves having known vulnerabilities may be discarded, according to mathematical descriptors or other characteristics of such vulnerabilities as stored in memory of or accessible to a user device 108 and/or secure computing module 112. Persons skilled in the art, upon reading the entirety of this disclosure, will be aware of various ways in which a random number may be used to generate a private and public key pair consistently with this disclosure.

Still viewing FIG. 3, key extraction may utilize a numerical output from a PUF 120 or other element of secure computing module 112 to generate an RSA private key or other private or symmetric public key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 120 and/or elements of secure computing module 112 may generate one or more random numbers, for instance by using one or more PUFs as described above; any suitable algorithm may be used for generating a prime from a random number to produce pairs of primes usable as RSA factors or other random numbers, public/private key, symmetric public key or the like. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 3, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. A secure computing module 112 may act as a "first signer" of a digital signature, signing with a private key produced from a secret generator as described above, which may be a group key. In an embodiment secure computing module 112 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by secure computing module 112 to perform a digital signature. This process may, for instance, enable generation of novel secret keys using additional circuitry, to demonstrate, for instance, timeliness of execution and frustrate delay-based attacks. DAA may perform digital signature using a zero-knowledge proof, for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

In an embodiment, and with continued reference to FIG. 3, secure proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 3, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be, as a non-limiting example, 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 3, secure proof may include be generated using a physically unclonable function and may utilize at least a random number generator (RNG), true random number generator (TRNG) or other source of entropy. For instance, and without limitation, an output of a PUF 120 may be used to generate a private key for a digital signature as described above. Alternatively or additionally, a PUF 120 output may constitute a secret to be used as a basis for a zero-knowledge proof, which may be any zero-knowledge proof as described herein.

Still referring to FIG. 3, secure computing module 112 and/or a user device 108 may generate one or more elements of additional information, which may be referred to herein as "verification data" that user or device may use to evaluate secure proof. Evaluating a secure proof may include receiving a verification datum corresponding to secure proof and evaluating the secure proof as a function of the verification datum. For instance, secure computing module 112 and/or a user device 108 may generate a public key; public key may be provided automatically to any querying device such as a verifying node 104. In an embodiment, public key may be generated using a recoverable key generation mechanism, as is described above for recoverable public/private key pairs via at least a PUF 120. Similarly, secure computing module 112 and/or user device 108 may generate data necessary to perform verification of a zero-knowledge proof by any verifying node 104 as described above. Such a verification datum may be included in transfer authorization token as described in further detail below, permitting user device 108 to demonstrate its link to a token by providing a corresponding secure proof on demand.

Continuing to refer to FIG. 3, at step 310 verifying node 104 authenticates the asset transfer request. Authenticating the asset transfer request may include determining the status of a user device 108 on the network. Status of a user device 108 on the network may indicate the trustworthiness of a user device 108. In an embodiment, authenticating may include authorizing the user device to participate in the network. For example, a user device 108 may be authorized to participate in the network but may not necessarily conduct an asset transfer when a user does not have sufficient funds to cover an asset transfer amount. Additionally or alternatively, a recipient device 136 may be authorized to join the network to receive an asset transfer but may not be the one initiating an asset transfer, instead a recipient device 136 may only need permission to join the network so as to receive an asset transfer. In yet another non-limiting embodiment, a user device 108 may seek authentication to join the network in anticipation of performing an asset transfer at some point in the future but not necessarily at the present moment. Authenticating may also include authorizing a user device 108 to initiate asset transfers. For example, a user device 108 that has adequate funds to substantiate an asset transfer may be authorized to initiate an asset transfer by a verifying node 104 after a verifying node 104 has received an asset transfer request from the user device 108. As part of the authentication process, a verifying node 104 may compare an asset transfer request received from a user device 108, to a revocation list. A revocation list may include any suitable listing of records identifying user devices 108 that may have privileges revoked to join the network, initiate asset transfers, and/or receive asset transfer, for example if a user device 108 cannot be identified by a verifying node 104. A user device 108 may also be listed on a revocation listing for example, if a user device 108 is trying to transfer an asset for which the user device 108 does not have enough assets to substantiate the transfer. In an embodiment, a revocation list may be part of a distributed data structure 128 and may be frequently updated and continuously monitored for changes in revocation status. Revocation list may include a temporal attribute, and a user device 108 may move on and off the revocation list such as after a quantifiable period of time has elapsed. In an embodiment, a revocation list may also include any suitable listing of records identifying verifying nodes 104 that may have privileges to verify and/or perform and engage in asset transfers revoked. A verifying node 104 may also compare an asset transfer request received from a user device 108 to an authentication listing 132. An authentication listing 132 may include and/or be included in a distributed data structure 128 as described above in reference to FIGS. 1-2.

With continued reference to FIG. 3, in an embodiment, authenticating a user device 108 may include determining a geographic location of a user device 108. This may be accomplished in various ways. For instance, and without limitation, determining the geographic location of a user device 108 may include identifying an internet protocol address of user device 108 and determining the geographic location as a function of internet protocol address; this may be accomplished according to IP address geolocation. Alternatively or additionally, determination of geographic location may include determination of proximity to a second verifying node 104, where second verifying node 104 may have a known, recorded, or verified geographic location, and/or of proximity to first verifying node 104.

Still referring to FIG. 3, proximity may be determined according one or more measures of distance or time second verifying node 104 and user device 108, and/or user device 108 and first verifying node 104. For instance, and without limitation, where one device is connected to another via a network, proximity may be evaluated by measuring distances between the two devices in a graph representing the network; proximity may include, for instance a number of steps through the graph from the once device to another. Steps may also be weighted according to, e.g., estimates of physical distance or length of wire between devices connected by steps, as measured using network latency analysis and/or other processes for instance as described below. Proximity may include geographical location of any devices as described above may alternatively or additionally be determined using navigational facilities, such as the global positioning system (GPS) or other protocols used to determine the location of a device. Distance between devices may be computed using this information. Proximity may include temporal proximity; this may be computed using network latency analysis, time for response to a "ping" signal, or the like. Alternatively or additionally, past response times and/or past times involving communications in the past may be recorded in memory and/or in a temporally sequential listing. In an embodiment, geographic location of user device 108 may be determined as near to or within a certain radius of a device having a known geographic location.

With continued reference to FIG. 3, authenticating may include calculating a heuristic of trust of a user device 108 by a verifying node 104. At least a heuristic of trust may include one or more processes for determining a degree to which user device 108 may be treated as trustworthy, based on partial or limited information; for instance, at least a heuristic of trust may be calculated or computed with regard to user device 108 not being identifiable using a secure computing module 112, by using geographic location, device fingerprint information, and/or other data as described in further detail herein, to identify determine trust in a device that is not as definitely identifiable as it would be using a secure computing module 112. At least heuristic of trust may output a confidence level as defined above as its output, and/or take at a confidence level as an input. Heuristics to infer trustworthiness of nodes and/or user devices 108 may be used in a positive or negative sense—that is, a positive heuristic connotes more trustworthiness, while a negative heuristic can be used to flag outliers that may be considered more likely to behave dishonestly.

Still referring to FIG. 3, calculation of at least a heuristic of trust may include determining a duration of past interaction and calculating the at least a heuristic as a function of the duration of past interaction; for instance, if user device 108 has a longer history of interactions with verifying node 104 and/or a network or platform at issue, verifying node 104 may assign a higher confidence level to user device 108. Calculating the at least a heuristic of trust may include determining a most recent time of past interaction and calculating the at least a heuristic of trust as a function of the most recent time of past interaction; for instance, where user device 108 has interacted with verifying node 104 and/or a network or platform in question more recently a higher confidence level may be associated with user device 108. Calculating at least a heuristic of trust may include determining a degree of obscurity of user device 108; for instance, where user device 108 is sandboxed (preventing evaluation of machine-control parameters), or connecting through a proxy, TOR or other location/IP address-obscuring protocol or facility, the resulting inability to discover information concerning user device 108 may itself be used to assign a lower confidence level to at least a user device 108.

With continued reference to FIG. 3, authenticating may include authenticating a user identity. Authenticating a user identity may include authenticating that a user is the owner of user device 108. Authenticating may include authenticating a user identity from an authentication datum provided by a user. An authentication datum may be a knowledge factor as a password that only user knows and only user is able to enter when prompted. Authenticating may include validating a user password, passphrase, and/or PIN. Authenticating may include authenticating a possession factor of a user such as authenticating a biometric authentication of a user. Biometric authentication may include any of the biometric authentications described above, for example scanning a user fingerprint, scanning an iris, and/or measuring the gait of a user. Biometric authentication may ensure that a user device 108 is being used by the owner of user device 108. In an embodiment, biometric authentication may be unimodal whereby only one biometric authentication is performed, or biometric authentication may be multimodal whereby two or more biometric authentications are performed. For example, a multimodal authentication may include a fingerprint scan and an iris scan. In an embodiment, multimodal authentication may be simultaneous, whereby two or more biometric authentications are occurring at the same time, or multimodal authentication may be performed in succession, whereby one biometric authentication is performed followed in succession by at least a second biometric authentication.

With continued reference to FIG. 3, authenticating may include calculating a confidence level of a user device 108. Calculating a confidence level may include calculating a confidence level as a function of the at least a confidence level in authenticity of a user device 108. Confidence level in identity may be computed, for instance, using one or more statistical measures of reliability of the identification method used; for instance, a user may enter an instruction on a processor providing statistics indicating success rates of various identification methods. Statistics may be collected based, as a non-limiting example, on discoveries of vulnerabilities in particular identification protocols and/or particular instances of secure computation module. A user of system may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise calculating a confidence level as a function of the confidence level in the identity. A device included in system 100 may also determine confidence level in identity as a function of, for instance, one or more algorithms collecting statistics concerning degree of accuracy in past iterations of a particular process for identifying at least a distributed storage node.

With continued reference to FIG. 3, at least a confidence level may include evaluating a biometric authentication of a user and calculating a confidence level to a user device 108 as a function of the biometric authentication of the user. Confidence level in biometric authentication may be computed, for instance, using one or more biometric authentication measures to suggest if a user device 108 is being used by its owner. For instance, a variety of biometric authentication measures to confirm behavior biometrics of a user may be tested, for example speech, voice, signature, keystroke, and/or gait may be measured and analyzed to determine if a user device 108 is being used by its owner. Biometric authentication measures may also employ the use of biometric sensors and scanners that may detect and acquire data necessary for biometric recognition and verification. This may include for example, sensors that may scan and analyze a user face, palm, vein, fingerprint, iris, retina, hand geometry, finger geometry, tooth shape, radiographic dental image, ear shape, olfactory, speech, voice, signature, keystroke dynamics recorder, and/or devices to perform movement signature recognition and/or gait energy images. Biometric sensors may incorporate other tools and technologies such as optical imaging, ultrasonic imaging, and capacitance imaging. In an embodiment, if a variety of biometric authentication measures suggest a user device 108 is being used by its owner, then biometric authentication accuracy may be reduced for a given threshold of transaction or time. For example, biometric authentication of user based on typing behavior, location, and fingerprint recognition may authenticate user as owner of user device 108. This may allow user to complete an asset transfer within a set period of time without having to reauthenticate user at a later stage in time. Alternatively or additionally, biometric authentication of user based on typing behavior, location and fingerprint recognition may authenticate user as owner of user device 108 so that threshold confidence level that may be needed for the remaining transaction may be reduced. For example, at subsequent stages in an asset transfer, user may only need to be authenticated by one biometric authentication, for example by a subsequent typing behavior analysis. Fingerprint recognition may not be necessary for subsequent authentications after being measured initially. In an embodiment, lowered confidence level for the remaining transaction may expire after a certain period of time in an attempt to prevent bad actors from being able to infiltrate system 100 after an initial biometric authentication has been performed.

With continued reference to FIG. 3, at least a confidence level may include a single confidence level assigned to a user device 108, a plurality of confidence levels assigned to a plurality of user devices 108, an aggregate confidence level of a plurality of user devices 108, or any other single or plural confidence level as described herein. Calculating a confidence level may include evaluating at least a digitally signed assertion signed by a verifying node 104 of the at least a user device 108 and calculating a confidence level to the user device 108 as a function of the evaluation of the at least a digitally signed assertion. At least a digitally signed assertion may be identified as signed by at least a verifying node 104 using any identification process or protocol as described above. In an embodiment, at least a digitally signed assertion may be incorporated in a temporally sequential listing of digitally signed assertions. For instance, where temporally sequential listing is a blockchain or similar data structure, each assertion may be included in the blockchain. At least a second digitally signed assertion may include a plurality of digitally signed assertions. For instance, at least a first distributed storage node may record a series of digitally signed assertions in temporally sequential listing; each transaction of the series of transactions may be authenticated by any process suitable for authenticating temporally sequential listing, including any process described herein for authentication of temporally sequential listing. As a further non-limiting example, at least a verifying node 104 may enter an initial digitally signed assertion attesting to one or more elements of identification and/or authentication, including without limitation attestation of manufacturing date of at least a user device 108 and/or secure computing module 112, identities, serial numbers, versions, or make of hardware components of at least a user device 108 and/or secure computing module 112, or the like. Transactions performed by at least a user device 108 may be scored according to authenticity; for instance, trusted status may be conferred on user device 108 only if a certain number of authenticated transactions have been performed by at least a user device 108, a certain amount of value has been conveyed in authenticated transactions by at least a user device 108, a certain proportion (which may be 100%) of transactions performed by at least a user device 108 have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by at least a data storage node, for instance.

Still referring to FIG. 3, calculating the at least a confidence level may include receiving a consensus evaluation of the at least a confidence level from a network of devices in system 100. For instance, all devices currently connected to network may determine a confidence level concerning a particular user device 108. This determination may be performed, for instance, by authenticating one or more current or past instances of a temporally sequential listing 204 and/or one or more sub-listings 208 thereof. Determination may include identification of one or more rejected instances of temporally sequential listing 204. Each device of a plurality of devices may provide a confidence level for the user device 108 to be evaluated. A device connected to network, including without limitation verifying node 104, may calculate an aggregate confidence level based on confidence levels submitted by plurality of verifying nodes 104; aggregation may be performed according to any method for aggregation of confidence levels described above. In an embodiment, aggregation may be weighted according to a previously determined confidence level of each verifying node 104 of distributed verifying nodes 128 performing consensus determination of confidence level of user device 108 to be evaluated. This may include, e.g., ignoring confidence level submissions from evaluators having confidence levels below a certain threshold; alternatively or additionally, a processor may request confidence level determinations by a plurality of evaluators previously determined to have a confidence level above a certain threshold level. Each verifying node 104 and/or other processor participating in consensus determination of confidence level may perform any action described herein for determining a confidence level, or any combination of such actions. Alternatively or additionally, and as further described below, each verifying node of plurality of verifying nodes may perform one or more steps of an embodiment of method 300, or other methods as described herein, to generate a transfer authorization token, as a function of authentication that each verifying node has performed.

With continued reference to FIG. 3, calculating the at least a confidence level may include evaluating a digitally signed assertion assigning a recorded confidence level to a user device 108, and calculating the confidence level as a function of the recorded confidence level. Digitally signed assertion may be any digitally signed assertion as described herein. Digitally signed assertion may be produced by a second verifying node 104, and/or other participant in system 100. Digitally signed assertion may be included in any temporally sequential listing as described herein; temporally sequential listing may include a temporally sequential listing relating identifiers of user device 108 and/or other devices incorporated in system 100 to confidence levels, where identifiers may be any data usable as identifiers as described herein. Assignment of confidence level may be performed as a function of identifier; that is, identifier may be linked to an identity of user device 108, which may be used for assignment of confidence level as described in this disclosure. A device making a determination, including without limitation verifying node 104, may receive an instance of temporally sequential listing; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, and/or a network of devices having a confidence level in excess of a threshold, may have previously evaluated a confidence level in a certain user device 108 and/or other device; in an embodiment, such a confidence level may itself be recorded in an assertion listed in temporally sequential listing 204. A plurality of such assertions, corresponding to a plurality of devices, including assertions corresponding to user device 108, may be listed; as such, a processor may determine confidence level in one or more user devices 108 solely by retrieving confidence levels so recorded. Alternatively or additionally, a processor may combine such confidence levels with confidence level determinations made by other means. Combination may be performed, e.g., by retrieving such confidence levels from temporally sequential listing 204 for at least a user device 108 and calculating a confidence level for at least a second user device 108 by any other process described above. As a further example, a processor may retrieve a confidence level recorded in temporally sequential listing 204 for a given device, determine a confidence level for the same device, and then aggregate the two confidence levels according to any process as described above for aggregation of confidence levels.

Still referring to FIG. 3, confidence level may be weighted or modified according to one or more additional factors. For instance, confidence level may be weighted according to how recently at least a user device 108 and/or other device signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level. As another example, a device that has recently "sold off" a large amount of value and/or has an assertion in a sub-listing 208 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 3, calculating the at least a confidence level may include performing a trusted time evaluation of at least an action performed by user device 108. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a secure computing module 112 is an authentic secure computing module 112 that has the property of attested time. Generating a secure timestamp may be used to weed out spoofs or "man in the middle attacks."

Still referring to FIG. 3, secure timestamp may record a current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 112. Additional data may include one or more additional data, including sensor data or a hash of data, that are received or generated by a processor. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other verifying nodes, may evaluate confidence levels in at least user device 108 or other party generating secure timestamp and/or perform threshold cryptography with a plurality of such parties, each of which may have performed an embodiment of method to produce a secure timestamp. In an embodiment, data storage nodes or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Continuing to refer to FIG. 3, in an embodiment, system 100 may utilize a distributed trusted time protocol. In an embodiment, distributed trusted time may be established using at least a verifying node, a monotonic counter and current local timestamp of at least a secure computing module 112, and a device signature. In such a scheme, a secure computing module 112 makes a sampling of local machine reference timebase into at least a secure enclave, and increments a monotonic counter also residing in the secure enclave. Secure computing module 112 signs the message containing local machine reference time and monotonic counter, and broadcasts this signed message. This process occurs at regular time intervals where the time interval T is less than the allowable clock skew of local machine reference timebase utilized in verifying node, such that one may readily determine whether an unexpected lapse forward or backward in distributed timebase is result of clock skew or a malicious actor attempting to falsify timestamp. Distributed time may further utilize two or more such verifying nodes broadcasting signed local machine reference timebases, their result being averaged or otherwise corrected. Verifying nodes selected to perform distributed time broadcast may be pre-defined, or may selected via random oracle by any means described herein with reference to selection of verifiers for authorization and token generation. Averaging or otherwise correcting outputs from multiple broadcasting local machine reference timebases may be done by all nodes, or may be performed by a selected at least a random leader, again selected via random oracle by any means described herein. In the latter case, broadcast from the averaging at least a random leader further incorporates monotonic counter and signature as described above. Rotation of selection of user devices 108 may occur periodically. For additional guarantees, signature may include a transfer authorization token as described below.

With continued reference to FIG. 3, at step 315 a verifying node 104 generates a transfer authorization token. Transfer authorization token may be used to confirm authentication of user device 108 and allow an asset transfer to proceed and be delivered to at least one recipient device, as described in more detail below. Transfer authorization token may include an authorization datum containing a digital signature. Generating the transfer authorization token may include associating the asset transfer request from a user device 108 with at least an authorization datum. Generating the transfer authorization token may be performed by a verifying node 104. A verifying node 104, which may include without limitation a verifying node as described in the '367 application referenced above, may be one of a group performing this by a consensus or threshold cryptography process, e.g. using key shards or the like. A verifying node 104 and or a plurality of verifying nodes 104 may instantiate or participate in a distributed certificate authority, which may include without limitation a distributed certificate authority as described in the '367 application referenced above. As used herein, an authorization datum is a datum granting one or more rights that may be requested in the asset transfer request. For instance, and without limitation, an authorization datum may include a digital certificate as described above; digital certificate may, for instance and without limitation, associate an identity of a user or entity operating a user device 108 with an identity of a user device 108, confer upon user a device 108 access rights to one or more resources incorporated in or connected to system 100, associate a user device 108 with a given confidence level, grant a transfer of assets from a user device 108 to at least a recipient device 136. An authorization datum may confer a right to access one or more resources incorporated in or connected to system 100. An authorization datum may associate an identity of a user or entity operating user device 108 with an identifier of user device 108. An authorization datum may confer upon user device 108 access rights to one or more resources incorporated in or connected to system 100. An authorization datum may associate user device 108 with a given confidence level. An authorization datum may grant a transfer of assets from a user device 108 to a recipient device 136. In an embodiment, an authorization datum may classify user device 108 as a verifying node, such as without limitation verifying node 104, authorized to perform actions described herein as performed by verifying node 104, which may be performed in combination with other verifying nodes.

Still referring to FIG. 3, in some cases it may be desirable to maintain anonymity (either anonymity of user device 108 with respect to verifying node 104, and/or anonymity of the user device 108 in subsequent use of the transfer authorization token on the network), while still issuing at least an authorization datum. In some embodiments a resulting transfer authorization token may include a temporal attribute. To facilitate anonymity, in an exemplary embodiment of transfer authorization token in which it is desired to maintain anonymity of the remote device while using at least a transfer authorization token, the at least a transfer authorization token may contain at least one of the following attributes: a secure timestamp indicating the time that the token was created, a monotonic counter value or other datum unique to the transfer authorization token for this particular user device 108, and/or a session key conferring access to the network at the time of token creation. Additionally or separately, at least a transfer authorization token may include a time limit, e.g. a fixed time limit relative to the verifier's local time the token was created or issued, and may include at least a trust level based upon the properties of the user device 108 attested in the authorization process, as described herein. Additionally or alternatively, at least a transfer authorization token may include a time period of exclusivity in which there is a certain period of time in which the transfer authorization token may be permitted to be used. In an embodiment, a temporal attribute such as a time period of exclusivity may have a start and/or end time at some point in time in the future. A start time may commence after a user device 108 has been granted access to the network. In an embodiment, a transfer authorization token that has not been used by a user device 108 may revert back to a verifying node 104, for example if a user cancels an asset transfer. In an embodiment, a user device 108 may revoke a transfer authorization token, and as such during that time user device 108 may not spend money any other way. It may be desirous to separately or additionally provide at least a session key enabling user device 108 to encrypt and/or decrypt messages to at least a recipient device 136, and/or a verifying node 104. In non-limiting example, session key may be a symmetric key conveyed via secure channel from the at least a verifying node 104, and/or an asymmetric key, multisignature, threshold signature or key system resulting from multi-signature or threshold signature as described above, or other key system or datum associated with at least a verifying node 104 during at least a time epoch. For example, a secure channel may include a secure socket layer communication, whereby a digital signature that may be digitally signed by a digital certificate verifies that a recipient such as a recipient device 136, verifying node 104, user device 108 and/or any other recipient has been verified before highly sensitive information is transmitted. This may ensure that decrypted information and/or decryption keys are being sent to an authenticated recipient device. The foregoing may be signed in whole or in part, or any logical combination, by the at least a verifying node.

With continued reference to FIG. 3, verifying node 104 may digitally sign authorization datum. Signing authorization datum may include any form of digital signature described above, including generating a secure proof as described above in FIGS. 1 and 2. The secure proof may be implemented according to a direct anonymous attestation protocol, and may include a digital signature, zero-knowledge proof, and/or a PUF as described above in FIGS. 1 and 2.

With continued reference to FIG. 3, verifying node 104 may generate a transfer authorization token containing the digitally signed authorization datum. Transfer authorization token may include a temporal attribute, that may set time limits of validity of user device 108 within a particular group of services, or for all network functions. In an embodiment, transfer authorization token may include a time-varying token, which may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, a time limit, a time period of exclusivity or other significant time relating to validity of time-varying token. Initial time may include, without limitation, a timestamp, which may include a secure timestamp, and/or a datum linked to a secure timestamp such as a cryptographic hash of the secure timestamp or the like. Initial time may be recorded in or with token. As a non-limiting example, time-varying token may include initial time, along with an identification of at least a user device 108, where identification may be membership in a group but otherwise anonymous, a unique persistent identification, or a unique but anonymous identification, and/or identification of a specific device, which may include any form of identification as described above, including without limitation a secure proof, alternatively or additionally, where time-varying token is recorded in a temporally sequentially listing, such as without limitation an authentication listing 132, initial time may be recorded as a time of insertion of a record or lot of records including time-varying token, a time of creation or authentication of a sublisting containing time-varying token, or the like. Time-varying token may include one or more attestations from other devices in system 100; as a non-limiting example, time-varying token may include secure proofs, such as without limitation digital signatures from one or more devices. One or more devices may include, without limitation, one or more verifying nodes 104; as an illustrative example, one or more verifying nodes 104 linked to time-varying tokens that have not yet expired may create one or more attestations included in a time-varying token linked to a device to be classified as a verified device using one or more attestations. In other words, a community of currently verified devices may be able to authenticate a device that is not currently verified. In an embodiment, a community of currently verified devices may evaluate the digitally signed authorization datum of first verifying node 104, identify user device 108 and the timestamp, and then apply a time limit to user device 108. In such an example, the time limit may be found in the transfer authorization token or may just be known by, for instance, network, group or subgroup specific parameters, application specific parameters, parameters associated with the confidence level or trust level of a device, and any combination thereof.

With continued reference to FIG. 3, a temporal attribute such as a time limit, may be based on the confidence level of user device 108. Confidence level may be calculated and assigned to user device 108 as previously discussed above in reference to FIG. 3. Confidence level, as an indication of trustworthiness and/or robustness to compromise by malicious actors of user device 108, may impact a temporal attribute of the transfer authorization token. For example, user device 108, having a high confidence level, thereby indicating a very trustworthy user device 108, may be granted a time-varying token with a longer time limit than a user device 108 that has a very low confidence level, and is not a trustworthy user device 108.

With continued reference to FIG. 3, transfer authorization token may include other information pertinent to perform an asset transfer. Transfer authorization token may include a recipient device 136 information. Recipient device 136 information may include an identifier of recipient device 136 such as location, network address, or recipient information such as bank account or routing number where an asset will be deposited. Recipient device 136 information may include receiving a key linked to recipient device 136. This may include for example, a public key linked to recipient device 136. Recipient device 136 information may include a secure proof from the recipient device. The secure proof may be implemented according to a direct anonymous attestation protocol and may include a zero-knowledge proof, and/or PUF as described in more detail above in reference to FIG. 1 and FIG. 2. Transfer authorization token may also include an asset to be transferred from user device 108 to recipient device 136. An asset may include but is not limited to tangible or intangible assets such as but not limited to money, currency, digital funds, digital currency, coins, legal tender, funds, bills, money orders, wire transfers, and/or cryptocurrency as described in more detail above in reference to FIGS. 1-3. Transfer authorization token may include a biometric identification of the user. Biometric authentication of user may be any of the authentications as described above in reference to FIG. 1. Biometric authentication may assist in ensuring asset transfer is coming from a verified user. In an embodiment, biometric authentication of user may be transmitted in transfer authorization token to recipient device 136. Biometric authentication may be transmitted as a secure proof, such as for example a zero-knowledge proof and/or a physically unclonable function. Secure proof may be generated according to any of the methods as described above in reference to FIG. 1 and FIG. 2.

With continued reference to FIG. 3, temporal attribute and/or token containing the temporal attribute may be available for other devices and/or verifying nodes 104 to view. In an embodiment, the temporal attribute and/or token containing the temporal attribute may be linked to the transfer authorization token. In an embodiment transfer authorization token may include a public key of a cryptographic system. In such an instance, other devices on the network may be able to access the public key and view both the duration of the transfer authorization token and how recently the transfer authorization token was generated. In an embodiment, the temporal attribute and/or token containing the temporal attribute may be linked to remote device 108 identifier and may be stored on a temporally sequential listing. Other devices and/or verifying nodes 104 may have access to the temporally sequential listing and may be able to view the transfer authorization token of user device 108. Authorization token may further include or be associated with a confidence level that verifying node 104 has associated with user device 108 as described above. In an alternative embodiment where the specifics of time remaining on an authorization token may be undesirable to expose, e.g. when such information may aid malicious actors in preferentially targeting a particular user device 108, authorization token, in the open or via shared cryptographic key specific to authenticate devices or a subset of authenticated devices, may simply indicate whether or not the token is valid at time of inquiry. It may be desirable to limit the number of requests for validity of a token, e.g. to avoid exposing information that may aid malicious actors in preferentially targeting a particular user device 108.

With continued reference to FIG. 3, and at step 320, verifying node 104 provides the transfer authorization token to at least one recipient device. Providing may include sharing the transfer authorization token with a recipient device 136 to prove that a user device 108 has been authenticated and/or granted some type of privilege to engage in an asset transfer. In an embodiment, providing may include making the transfer authorization token public so that it is visible to other devices, or a subset of devices (e.g. only those with a shared cryptographic key) to be easily ascertained. In an embodiment, providing may include inserting and recording the authorization token in a temporally sequential listing, such as for example authentication listing 132. In an embodiment, the authorization token may be included in a ledger, such as one described above in reference to FIG. 2 and/or a directed acyclic graph. In an embodiment, an authorization token inserted in a temporally sequential listing and/or ledger may allow for recipient device 136 to call in the transfer authorization token from any location on the network. Providing may also include sharing the transfer authorization token with user device 108. Providing may include sharing the transfer authorization token with a third-party such as for example, a bank or lending institution which may then use transfer authorization token to verify and update account information of a user and/or a recipient. In an embodiment, providing to a third-party may be done automatically such as for example when the authorization token is included in a temporally sequential listing and/or a directed acyclic graph whereby a third-party can see an asset-transfer and incorporate the transfer authorization token to reflect an updated account balance for a user and/or a recipient.

With continued reference to FIG. 3, asset transfer may be kept and/or spent by recipient device 136. In an embodiment, asset transfer may be contained within a transfer authorization token. The transfer authorization token containing the asset transfer may be kept and stored by recipient device 136. Recipient device 136 may store asset transfer indefinitely, and/or for later use to be spent and/or transferred. For example, asset transfer and/or a value transferred thereby may be exchanged for goods and services by recipient device 136. In yet another non-limiting example, asset transfer and/or a value transferred thereby may be spent by performing one or more subsequent asset transfers from a recipient device 136 to a different recipient device 136 according to any process and/or process step as described above; any method and/or method step as described above may be repeated any number of times to transfer an asset or a portion thereof from one device to another; recent device 136 may act as user device 108 in one iteration while acting as a recipient device 136 in another iteration, while user device 108 may act as a recipient device 136 in some iterations and a user device 108 in others. In yet another embodiment, part of asset transfer may be kept by a recipient device 136 and part of asset transfer may be spent on goods and services.

In an embodiment, performing asset transfers by anyone or more of the aspects and embodiments described herein assists in ensuring accuracy and reliability of performing an asset transfer. Frequently, asset transfers can be subject to hacking or spoofing of user information and identity. Performing asset transfers as described herein may assist in confirming both user and user device authentication through authentication protocols such as biometric authentication. Further, transfer authorization tokens include temporal attributes which may be used to prevent double spending by providing time limits for when an asset transfer may take place and/or how long a device may be authenticated for to perform an asset transfer. Transferring asset transfer data to a distributed database on an immutable ledger assists in ensuring accuracy of transactions as well as preventing malicious alterations to transfer data. Asset transfers performed in this manner ensure higher integrity as well as authenticity of users and recipients engaged in an asset transfer.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
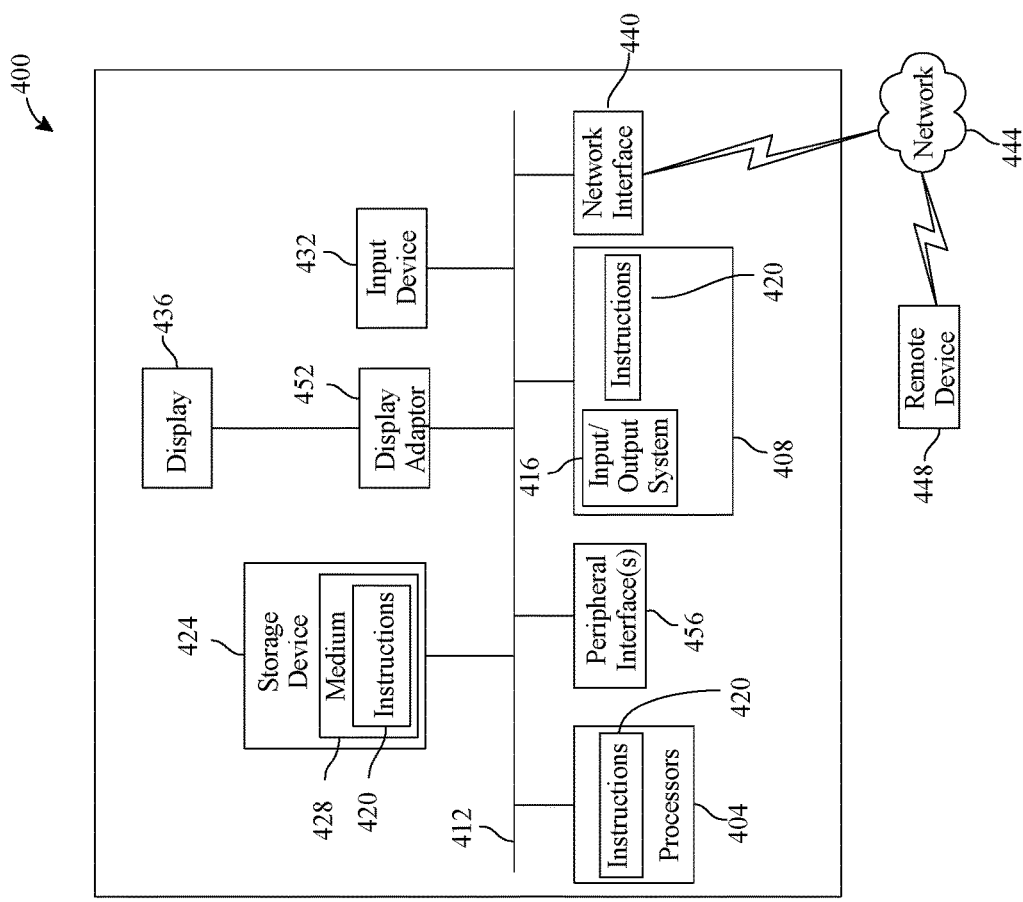
FIG. 4 is a block diagram of a computing system that can be used to implement any one or more of the methodologies disclosed herein and any one or more portions thereof.

Referring now to FIG. 4, a block diagram of a computing system that can be used to implement any one or more of the methodologies disclosed herein and any one or more portions thereof. FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

With continued reference to FIG. 4, memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of cryptographic authorization of wireless communications, the method comprising:
   receiving, at a verifying node, a transfer request from a user device to execute an asset transfer transaction;
   authenticating, by the verifying node, the transfer request as a function of a biometric authentication;
   calculating, by the verifying node, at least a heuristic of trust of the user device by determining a degree of obscurity of the user device;
   assigning, by the verifying node, a confidence level to the user device as a function of the biometric authentication and the degree of obscurity of the user device, wherein assigning the confidence level further comprises:
      assigning a first threshold confidence level to the user device as a function of at least a first biometric authentication and a second biometric authentication; and
      assigning, if the first threshold confidence level is met by the user device, a second threshold confidence level to the user device as a function of the first biometric authentication for a subsequent stage of the asset transfer transaction, wherein the second threshold confidence level is lower than the first threshold confidence level;
   generating, by the verifying node, a transfer authorization token, wherein generating the transfer authorization token further comprises:
      associating, the transfer request from the user with at least an authorization datum;
      digitally signing the authorization datum with a private key, wherein the private key is generated from a physically unclonable function associated with unique physical characteristics of a hardware processor; and
      generating the transfer authorization token containing the digitally authorization datum;
   providing, by the verifying node, the transfer authorization token to at least one recipient device; and
   transferring, from the user device to the at least one recipient, an asset as a function of the transfer authorization token.

2. The method of claim 1, wherein receiving the transfer request further comprises:
   receiving a cryptographic proof from the user device; and
   cryptographically verifying the cryptographic proof.

3. The method of claim 1, wherein authenticating further comprises comparing the transfer request from the user device to a revocation listing.

4. The method of claim 1, wherein authenticating further comprises comparing the transfer request from the user device to an authentication listing.

5. The method of claim 1, wherein authenticating further comprises determining a location of the user device.

6. The method of claim 1, wherein authenticating further comprises determining, by the verifying node, at least a heuristic of trust as a function of the at least a transfer request from the user device.

7. The method of claim 1, wherein the transfer authorization token includes recipient device information.

8. The method of claim 1, wherein generating the transfer authorization token includes associating a temporal attribute with the transfer authorization token.

9. The method of claim 1, wherein providing the transfer authorization token further comprises incorporating the transfer authorization token in an instance of an authentication listing.

10. A system for cryptographic authorization of wireless communications, the system comprising:
   a verifying node comprising a hardware processor configured to:
      receive a transfer request from a user device to execute an asset transfer transaction;
      authenticate the transfer request as a function of a biometric authentication;
      calculating at least a heuristic of trust of the user device by determining a degree of obscurity of the user device;
      assign a confidence level to the user device as a function of the biometric authentication and the degree of obscurity of the user device, wherein assigning the confidence level further comprises:
         assigning a first threshold confidence level to the user device as a function of at least a first biometric authentication and a second biometric authentication; and
         assigning, if the first threshold confidence level is met by the user device, a second threshold confidence level to the user device as a function of the first biometric authentication for a subsequent stage of the asset transfer transaction, wherein the second threshold confidence level is lower than the first threshold confidence level;
      generate a transfer authorization token, wherein generating the transfer authorization token further comprises:
         associating, the transfer request from the user with at least an authorization datum;
         digitally signing the authorization datum with a private key, wherein the private key is generated from a physically unclonable function associated with unique physical characteristics of a hardware processor; and generating the transfer authorization token containing the digitally authorization datum;
provide the transfer authorization token to at least one recipient device; and
transfer, from the user device to the at least one recipient, an asset as a function of the transfer authorization token.

11. The system of claim 10, wherein the verifying node is further configured to receive the transfer request by:
receiving a cryptographic proof from the user device; and
cryptographically verifying the cryptographic proof.

12. The system of claim 10, wherein the verifying node is further configured to authenticate by comparing the transfer request from the user device to a revocation listing.

13. The system of claim 10, wherein the verifying node is further configured to authenticate by comparing the transfer request from the user device to an authentication listing.

14. The system of claim 10, wherein the verifying node is further configured to authenticate by determining a location of the user device.

15. The system of claim 10, wherein the verifying node is further configured to authenticate by determining, by the verifying node, at least a heuristic of trust as a function of the at least a transfer request from the user device.

16. The system of claim 10, wherein the transfer authorization token includes recipient device information.

17. The system of claim 10, wherein generating the transfer authorization token includes associating a temporal attribute with the transfer authorization token.

18. The system of claim 10, wherein the verifying node is further configured to provide the transfer authorization token by incorporating the transfer authorization token in an instance of an authentication listing.

* * * * *